US006990955B2

(12) United States Patent
Niimi

(10) Patent No.: US 6,990,955 B2
(45) Date of Patent: Jan. 31, 2006

(54) SPARK IGNITION ENGINE

(75) Inventor: Kuniaki Niimi, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/880,536

(22) Filed: Jul. 1, 2004

(65) Prior Publication Data

US 2005/0005906 A1 Jan. 13, 2005

(30) Foreign Application Priority Data

Jul. 9, 2003 (JP) ............................ 2003-194341
Jun. 25, 2004 (JP) ............................ 2004-187667

(51) Int. Cl.
*F02M 25/14* (2006.01)
*F02P 11/06* (2006.01)
*F02P 5/152* (2006.01)

(52) U.S. Cl. .................... 123/406.3; 123/575; 123/577

(58) Field of Classification Search ................ 123/1 A, 123/406.3, 406.31, 575, 577
See application file for complete search history.

(56) References Cited

U.S. PATENT DOCUMENTS 4,708,113 A * 11/1987 Harada et al. ........... 123/406.3
4,854,286 A * 8/1989 Chemnitzer .............. 123/406.3
4,915,079 A * 4/1990 Holmes ................. 123/406.24
5,711,272 A * 1/1998 Maegawa et al. ........... 123/1 A
5,868,117 A * 2/1999 Moote et al. ............... 123/1 A
6,073,611 A * 6/2000 Ohuchi et al. .............. 123/1 A
6,412,472 B1 * 7/2002 Tilagone et al. ......... 123/406.3

FOREIGN PATENT DOCUMENTS

GB 2 343 714 A 5/2000
JP A-07-208310 8/1995
JP A-2000-154771 6/2000
JP A-2000-179368 6/2000
JP A-2000-329013 11/2000
JP A-2001-50070 2/2001
JP A-2001-193525 7/2001

* cited by examiner

*Primary Examiner*—Erick Solis
(74) *Attorney, Agent, or Firm*—Oliff & Berridge, PLC

(57) ABSTRACT

There is provided a spark ignition engine having a low RON fuel tank to store a low RON fuel and a high RON fuel tank to store a high RON fuel, which can detect storage failure. It is judged that the two kinds of fuels are properly stored when differences between the base ignition timing and the practical ignition timing at different loads are identical. When the differences are not identical, for example, it is judged that the high RON fuel is stored both in the two fuel tanks when a difference between the proper mix fuel knocking-occur ignition timing and the practical ignition timing is decreased as the load is increased. When a difference between the proper mix fuel knocking-occur ignition timing and the practical ignition timing is increased as the load is increased, it is judged that the two kind of fuels are reversely stored when a difference of differences between the proper mix fuel knocking-occur ignition timing and practical ignition timing at predetermined two load is greater than a predetermined threshold, and it is judges that the low RON fuel is stored both in the two tanks when the difference of differences between the proper mix fuel knocking-occur ignition timing and practical ignition timing at predetermined two load is smaller than a predetermined threshold.

11 Claims, 8 Drawing Sheets

SPARK IGNITION ENGINE

BACKGROUND OF THE INVENTION

1. Field of the Invention

The present invention relates to a spark ignition engine in which a high RON fuel and a low RON fuel are mixed and supplied to a combustion chamber.

2. Description of the Related Art

The low RON fuel has a good ignition quality and a poor anti-knock quality, and the high RON fuel has a poor ignition quality and a good anti-knock quality. Accordingly, an engine, which is provided with a low RON fuel tank in which low RON fuel is stored and high RON fuel tank in which high RON fuel is stored, and the low RON fuel and the high RON fuel are mixed in accordance with operating conditions of the engine, and the mixture is supplied to a combustion chamber, is known. For example, Japanese Unexamined Patent Publication (Kokai) No. 2001-50070 disclosed such type engine.

In the above type engine, because of providing with two fuel tanks, there is a possibility that low RON fuel and high RON fuel may be improperly stored in the low RON fuel tank and the high RON fuel tank.

For example, a possibility that the low RON fuel may be stored in both the low RON fuel tank and the high RON fuel tank, the high RON fuel may be stored in both the low RON fuel tank and the high RON fuel tank, or the low RON fuel and the high RON fuel may be stored in the high RON fuel tank and the low RON fuel tank, respectively. Consequently, fuel not suitable for an operating condition is injected and the engine performance cannot be fully obtained.

However, the apparatus disclosed in Japanese Unexamined Patent Publication (Kokai) No. 2001-50070 cannot detect the fuel storage failures described above.

SUMMARY OF THE INVENTION

The object of the present invention is to detect a fuel storage failure in a spark ignition engine provided with a low RON fuel tank to store a low RON fuel and a high RON fuel tank to store a high RON fuel, in which the fuels are injected into a combustion chamber at a mixing ratio in accordance with the state of operation of the engine.

According to the present invention, there is provided a spark ignition engine provided with a low RON fuel tank to store a low RON fuel and a high RON fuel tank to store a high RON fuel, in which the fuel in the low RON fuel tank and the fuel in the high RON fuel tank are injected into a combustion chamber, at a mixing ratio in accordance with the state of operation of the engine, comprising fuel mixing means for mixing the fuel from the high RON fuel tank and the fuel from the low RON fuel tank at a predetermined mixing ratio, so that the ratio of the fuel from the high RON fuel tank is increased as the load is increased and the ratio of the fuel from the low RON fuel tank is increased as the load is decreased; practical ignition timing determination means for determining a practical ignition timing based on the state of occurrence of knocking during a practical operation of the engine; and comparing ignition timing memory means for storing a comparing ignition timing with which the practical ignition timing is compared, wherein whether or not the low RON fuel and the high RON fuel are properly stored in the low RON fuel tank and the high RON fuel tank, respectively, is judged based on differences between the comparing ignition timing and the practical ignition timing, at predetermined plural load values.

With the above structure of the spark ignition engine having the low RON fuel tank and the high RON fuel tank, whether or not the low RON fuel and the high RON fuel are properly stored in the low RON fuel tank and the high RON fuel tank, respectively, is judged based on differences between the comparing ignition timing and the practical ignition timing, at plural load values.

In an aspect of the present invention, the comparing ignition timing memory means stores a base ignition timing which is set in parallel with a proper mix fuel knocking-occur ignition timing representing a knocking occur ignition timing when the low RON fuel is stored in the low RON fuel tank and the high RON fuel is stored in the high RON fuel tank, respectively, in relation to the load, and the practical ignition timing determination means determines that an ignition timing obtained by advancing an adjusting ignition advance angle from the base ignition timing to an actual knocking limit is identical to the practical ignition timing.

In an aspect of the present invention, it is judged that the low RON fuel and the high RON fuel are properly stored to the low RON fuel tank and the high RON fuel tank when differences between the base ignition timing and the practical ignition timing at different loads are identical, and it is judged that the low RON fuel and the high RON fuel are improperly stored to the low RON fuel tank and the high RON fuel tank when differences between the base ignition timing and the practical ignition timing at different loads are not identical.

In an aspect of the present invention, it is judged that the low RON fuel is stored both in the low RON fuel tank and the high RON fuel tank when differences between the base ignition timing and the practical ignition timing at different loads are not identical.

In an aspect of the invention, the comparing ignition timing memory means stores the proper mix fuel knocking-occur ignition timing as a comparing ignition timing, and when differences between the base ignition timing and the practical ignition timing at different loads are not identical and judged that the low RON fuel and the high RON fuel are improperly stored to the low RON fuel tank and the high RON fuel tank, it is judged that the high RON fuel is stored both in the low RON fuel tank and the high RON fuel tank when a difference between the proper mix fuel knocking-occur ignition timing and the practical ignition timing is decreased as the load is increased, and it is judged that the low RON fuel is stored in both the low RON fuel tank and the high RON fuel tank or the low RON fuel is stored in the high RON fuel tank and the high RON fuel is stored in the low RON fuel tank when a difference between the proper mix fuel knocking-occur ignition timing and the practical ignition timing is increased as the load is increased.

In an aspect of the invention, the comparing ignition timing memory means stores the proper mix fuel knocking-occur ignition timing as a comparing ignition timing, and when differences between the base ignition timing and the practical ignition timing at different loads are not identical and judged that the low RON fuel and the high RON fuel are improperly stored to the low RON fuel tank and the high RON fuel tank, it is judged that the high RON fuel is stored both in the low RON fuel tank and the high RON fuel tank when the practical ignition timing is more advanced than the proper mix fuel knocking-occur ignition timing, and it is judged that the low RON fuel is stored both in the low RON fuel tank and the high RON fuel tank or the low RON fuel is stored in the high RON fuel tank and the high RON fuel is stored in the low RON fuel tank when the practical ignition timing is more retarded than the proper mix fuel knocking-occur.

In an aspect of the invention, when it is judged that the low RON fuel is stored in both in the low RON fuel tank and the high RON fuel tank or the low RON fuel is stored in the high RON fuel tank and the high RON fuel is stored in the low RON fuel tank, it is judged that the low RON fuel is stored in the high RON fuel tank and the high RON fuel is stored in the low RON fuel tank when a difference of differences between the proper mix fuel knocking-occur ignition timing and practical ignition timing at predetermined two load is greater than a predetermined threshold, and it is judged that the low RON fuel is stored both in the high RON fuel tank and the low RON fuel tank when a difference of differences between the proper mix fuel knocking-occur ignition timing and practical ignition timing at predetermined two load is less than a predetermined threshold.

In an aspect of the invention, when it is judged that the low RON fuel is stored both in the low RON fuel tank and the high RON fuel tank or the low RON fuel is stored in the high RON fuel tank and the high RON fuel is stored in the low RON fuel tank, it is judged that the low RON fuel is stored in the high RON fuel tank and the high RON fuel is stored in the low RON fuel tank when a difference between the proper mix fuel knocking-occur ignition timing and practical ignition timing at a predetermined load is greater than a predetermined threshold, and it is judged that the low RON fuel is stored both in the high RON fuel tank and the low RON fuel tank when a difference between the proper mix fuel knocking-occur ignition timing and practical ignition timing at a predetermined load is less than a predetermined threshold.

In an aspect of the present invention, there is provided judgment result display means to display judgment results. With the above structure of the spark ignition engine, a driver can recognize whether or not the fuels are properly stored in the low RON fuel tank and the high RON fuel tank.

The present invention may be more fully understood from the description of preferred embodiments of the invention set forth below, together with the accompanying drawings.

DESCRIPTION OF THE PREFERRED EMBODIMENTS

Embodiments of the present invention will be described below with reference to the accompanying drawings.

Figure 1:
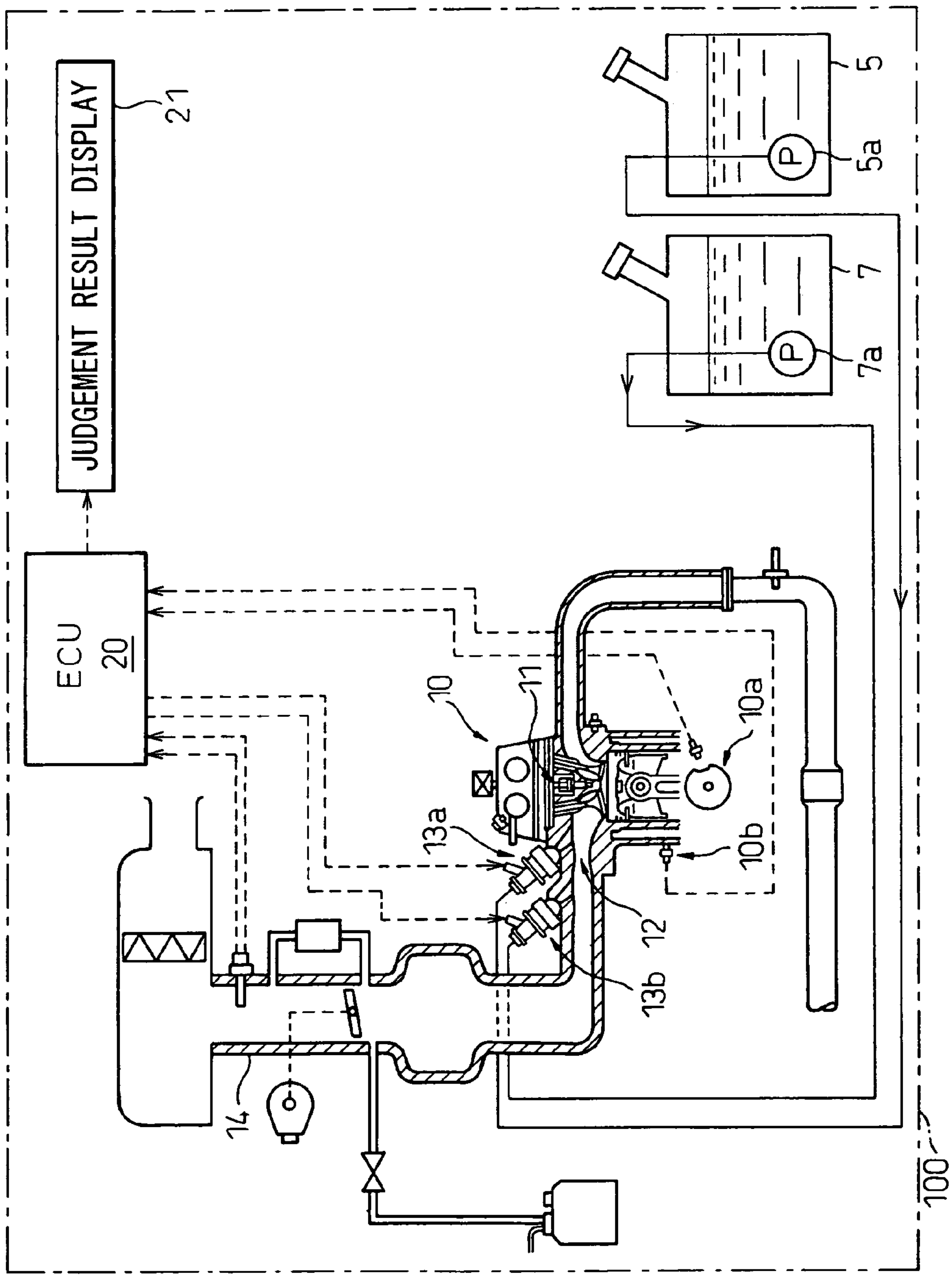
FIG. 1 shows a hardware structure of an embodiment of the present invention.

FIG. 1 is a schematic view of a structure of a hardware according to the present embodiment. In FIG. 1, a spark ignition engine 10 having spark plug 11 is mounted in a vehicle 100. The engine 10 is provided with a low RON fuel tank 5 to which a low RON fuel should be fueled and a high RON fuel tank 7 to which a high RON fuel should be fueled.

The fuel in the low RON fuel tank 5 and the fuel in the high RON fuel tank 7 are supplied to fuel injectors 13*a*, 13*b* attached to an intake port 12 of a spark ignition engine (hereinafter simply referred to as "engine") 10 having a spark plug 11 by a low RON fuel pump 5*a* and a high RON fuel pump 7*a*, respectively. The fuel injectors 13*a*, 13*b* inject the low RON fuel and high RON fuel, at a predetermined ratio suitable for a driving condition, to the intake port 12, based on a command from an electronic control unit (ECU) 20 and, then, the injected fuels are mixed in the intake port 12 and a combustion chamber. Therefore, fuel mixing means is composed of the fuel injectors 13*a*, 13*b*, the ECU 20, the intake port 12 and the combustion chamber.

In the present embodiment, the intake port 12 is provided with two fuel injectors 13*a*, 13*b*. However, only one of the injectors may be an injector which can directly inject fuel into a cylinder, or an integral-type injector which can inject two fuels to the intake port 12 may be provided.

A crank angle sensor 10*a* to detect an engine speed and a knock sensor 10*b* to measure the state of occurrence of knocking are attached to the engine 10. An airflow meter 14*a* to detect, as a load, an intake air quantity is attached to an intake pipe. The detected values of the sensors and the meter are sent to the ECU 20.

Signals from the other sensors are sent to the ECU 20, and signals are sent from the ECU 20 to control devices. However, signals that are not directly related to the present invention are omitted.

Figure 2:
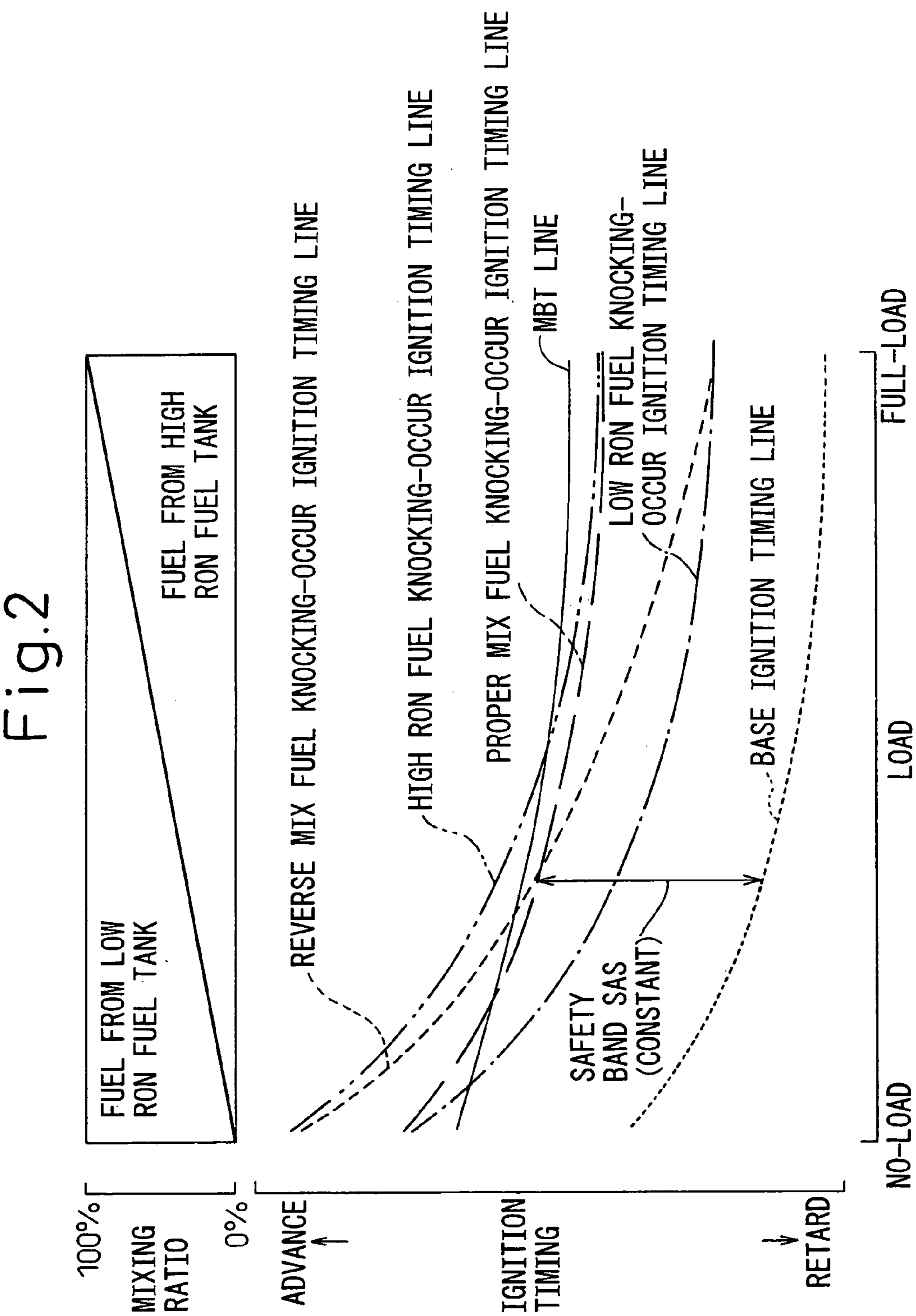
FIG. 2 is a diagram showing a setting of an ignition timing.

Ignition timing according to the present embodiment will be described with reference to FIG. 2. The upper portion in FIG. 2 shows a mixing ratio of fuels supplied from the low RON fuel tank 5 and the high RON fuel tank 7 to the engine 10 in accordance with variations of a load at a same engine speed. As shown in the drawing, the mixing ratio is preset so that the fuel from the low RON fuel tank 5 is 100% at no-load, and the fuel from the high RON fuel tank 7 is 100% at full-load.

A one-dot chain line represents a line of a knocking-occur ignition timing at each load when the low RON fuel is stored in both the low RON fuel tank 5 and the high RON fuel tank 7, so that only the low RON fuel is injected at any load. Hereinafter, this line is referred to as "low RON fuel knocking-occur ignition timing line".

A two-dot chain line represents a line of a knocking occur ignition timing at each load when the high RON fuel is stored in both the low RON fuel tank 5 and the high RON fuel tank 7, and only the high RON fuel is injected at any load. Hereinafter, this line is referred to as "high RON fuel knocking-occur ignition timing line".

The low RON fuel knocking-occur ignition timing line is in parallel with the high RON fuel knocking-occurs ignition timing line.

A long dashed line represents a line of a knocking-occur ignition timing when the low RON fuel is stored in the low RON fuel tank 5 and the high RON fuel is stored in the high RON fuel tank 7, i.e., when the fuels are stored properly.

Hereinafter, this line is referred to as "proper mix fuel knocking-occur ignition timing line". The proper mix fuel knocking-occur ignition timing line comes closer to the high RON fuel knocking-occur ignition timing line as the load is increased, and coincides with the high RON fuel knocking-occur ignition timing line at the full-load. Contrary to this, the proper mix fuel knocking-occur ignition timing line comes closer to the low RON fuel knocking-occur ignition timing line as the load is decreased, and coincides with the low RON fuel knocking-occur ignition timing line at the no-load.

A short dashed line represents a line of a knocking-occur ignition timing when the high RON fuel is accidentally stored in the low RON fuel tank and the low RON fuel is accidentally stored in the high RON fuel tank, i.e., when the fuels are completely reversely stored. Hereinafter, this line is referred to as "reverse mix fuel knocking-occur ignition timing line". The reverse mix fuel knocking-occur ignition timing line comes closer to the low RON fuel knocking-occur ignition timing line as the load is increased, and coincides with the low RON fuel knocking-occur ignition timing line at the full-load. Contrary to this, the reverse mix fuel knocking-occur ignition timing line comes closer to the high RON fuel knocking-occur ignition timing line as the load is decreased, and coincides with the high RON fuel knocking-occur ignition timing line at the no-load.

A dotted line represents a line of a base ignition timing SAB, which is obtained by shifting in parallel the proper mix fuel knocking-occur ignition timing line, by an amount corresponding to a safety band that is constant over the entire load area, toward the "retard" side. Hereinafter, this line is referred to as "base ignition timing line". This base ignition timing line is determined on experimental results and memorized in the ECU 20 together with the proper mix fuel knocking-occur ignition timing line.

A thin solid line is a MBT line representing a line of MBT (Minimum Spark Advance for Best torque) for a case in which fuels are properly stored. This MBT line is also determined on experimental results and memorized in the ECU 20 like as the base ignition timing line and proper mix fuel knocking-occur ignition timing line.

However, the low RON fuel knocking-occur ignition timing line, the high RON fuel knocking-occur ignition timing line, the reverse mix fuel knocking-occur ignition timing line are expected lines, and therefore not memorized in the ECU 20.

During operation, an ignition is carried out at a practical ignition timing SA obtained by advancing the base ignition timing SAB to a knocking limit. This advancing operation is carried out by a so-called knocking control, in which the timing is advanced until a knock sensor 10*a* detects knocking, and when knocking is detected, the timing is retarded by a slight amount so as not to detect the knocking and the timing is advanced again until the knock sensor 10*a* detects the knocking and these operations are repeated.

The advance angle between the base ignition timing SAB and the practical ignition timing SA is referred to as "adjusting ignition advance angle" designated by DSA. Therefore, the relation is expressed by the following:

$$\text{Practical ignition timing } SA = \text{Base ignition timing } SAB + \text{Adjusting ignition advance angle } DSA$$

However, the practical ignition timing is set to MBT (Minimum Spark Advance for Best Torque) when the MBT is more retarded than the knocking limit.

As described above, with regard to the correct or wrong of storage, there are four cases as follows.

Case A: The low RON fuel is stored in the low RON fuel tank 5 and the high RON fuel is stored in the high RON fuel tank 7, i.e., the fuels are stored properly.

Case B: The low RON fuel is stored in both the low RON fuel tank 5 and the high RON fuel tank 7, i.e., the low RON fuel is accidentally stored in the high RON fuel tank 7.

Case C: The high RON fuel is stored in both the low RON fuel tank 5 and the high RON fuel tank 7, i.e., the high RON fuel is accidentally stored in the low RON fuel tank 5.

Case D: The high RON fuel is stored in the low RON fuel tank 5 and the low RON fuel is stored in the high RON fuel tank 7, i.e., the high RON fuel and the low RON fuel are stored in wrong tanks.

Figure 3:
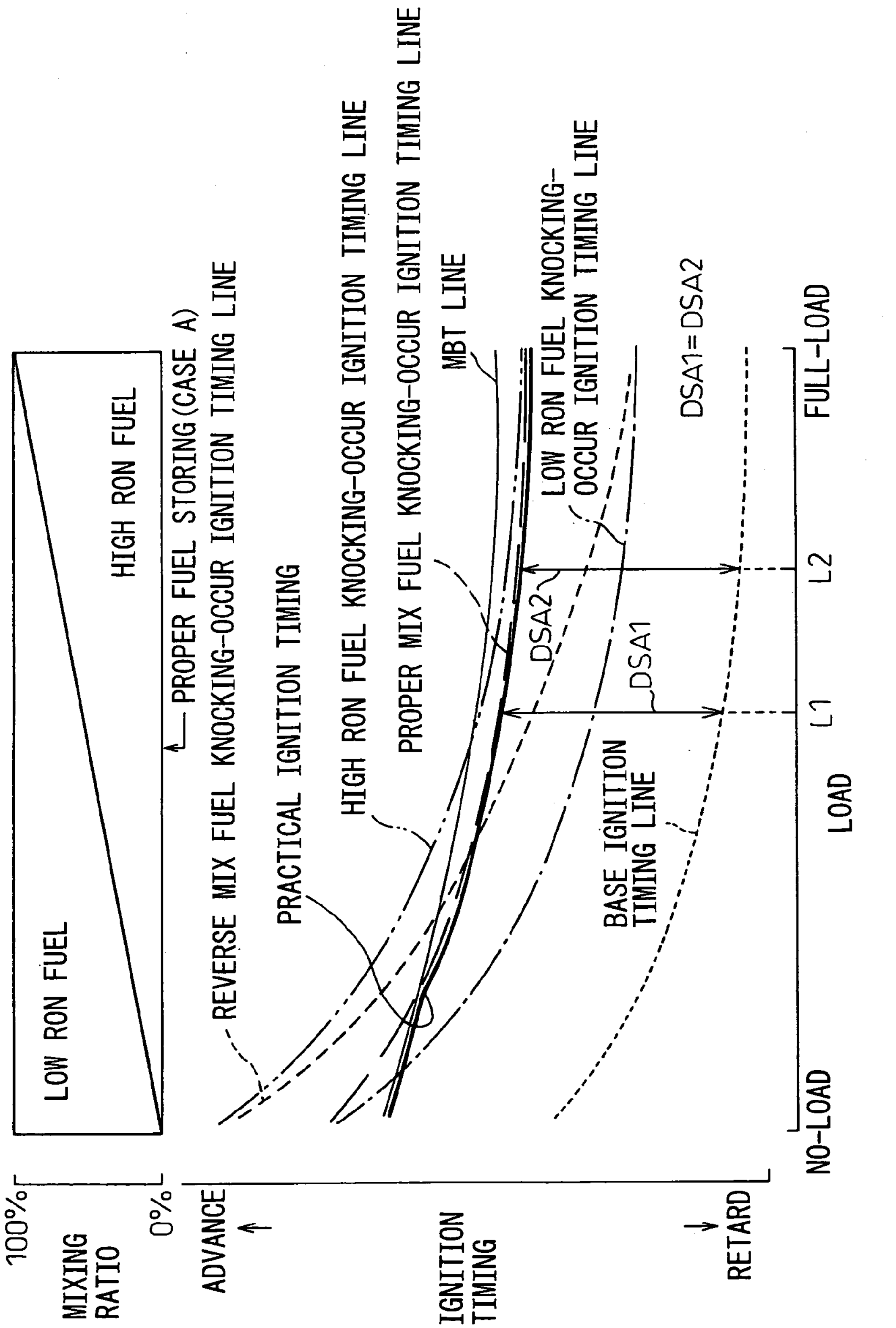
FIG. 3 is a diagram showing an ignition timing when a fuel is properly fueled.

FIG. 3 is an explanatory view of Case A, in which six ignition timing lines (the low RON fuel knocking-occur ignition timing line, the high RON fuel knocking-occur ignition timing line, the proper mix fuel knocking-occur ignition timing line, the reverse mix fuel knocking-occur ignition timing line, and the MBT line), which are shown in FIG. 2, are shown.

The practical ignition timing SA coincides with the proper mix fuel knocking-occur ignition timing if the proper mix fuel knocking-occur ignition timing is more retarded than the MBT, and the practical ignition timing SA coincides with the MBT if the proper mix fuel knocking-occur ignition timing is more advanced than the MBT. Therefore, the practical ignition timing SA changes as shown by a thick solid line.

As described above, the base ignition timing SAB is obtained by shifting, by a predetermined amount corresponding to the safety band SAS, the proper mix fuel knocking-occur ignition timing line toward the "retard" side, regardless of the load. Therefore, in Case A, the adjusting ignition advance angle DSA between the base ignition timing SAB and the practical ignition timing SA is constant in a zone where the proper mix fuel knocking-occur ignition timing is more retarded than the MBT, and is identical to the safety band SAS which is a shifting amount between the proper mix fuel knocking-occur ignition timing line and the base ignition timing line. Therefore, the adjusting ignition advance angles DSA1 and DSA2 at load values L1 and L2 (L1<L2), preselected in a zone where the proper mix fuel knocking-occur ignition timing is more retarded than the MBT, are identical, i.e., DSA1=DSA2.

Figure 4:
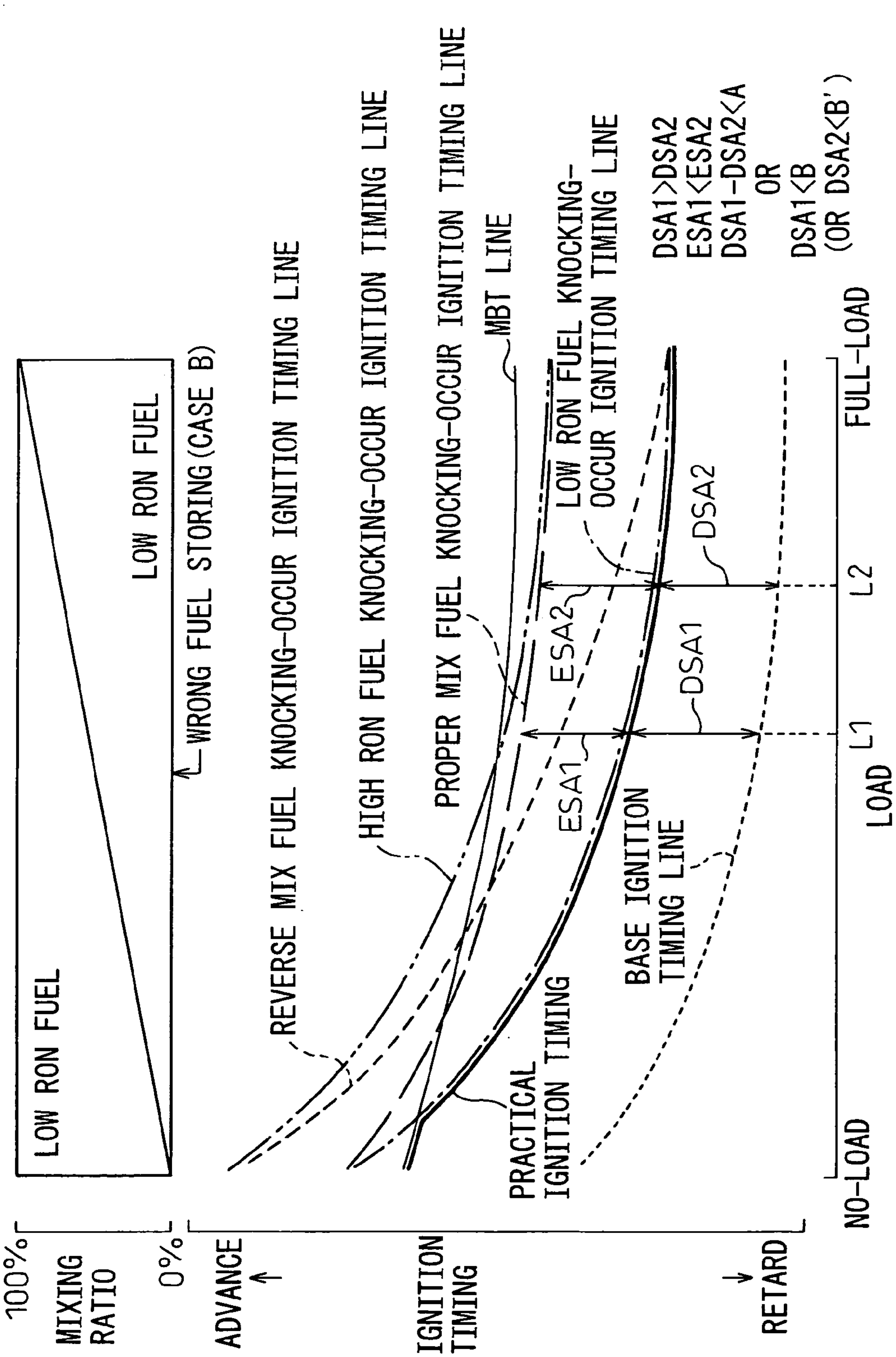
FIG. 4 is a diagram showing an ignition timing when a low RON fuel is stored in both a low RON fuel tank and a high RON fuel tank.

FIG. 4 is an explanatory view of Case B, in which only the low RON fuel is injected in a range from the no-load to the full-load, in a same engine speed, and six ignition timing lines shown in FIG. 2, are shown.

The practical ignition timing SA coincides with the low RON fuel knocking-occur ignition timing line if the low RON fuel knocking-occur ignition timing is more retarded than the MBT, and the practical ignition timing SA coincides with the MBT if the low RON fuel knocking-occur ignition timing is more advanced than the MBT. Therefore, the practical ignition timing SA changes as shown by a thick solid line.

The low RON fuel knocking-occur ignition timing line comes closer to the proper mix fuel knocking-occur ignition timing line as the load is decreased. Therefore, in a comparison of the adjusting ignition advance angles DSA1 and DSA2 at load values L1 and L2 (L1<L2), preselected in a zone where the low RON fuel knocking-occur ignition timing is more retarded than the MBT, DSA1>DSA2.

Figure 5:
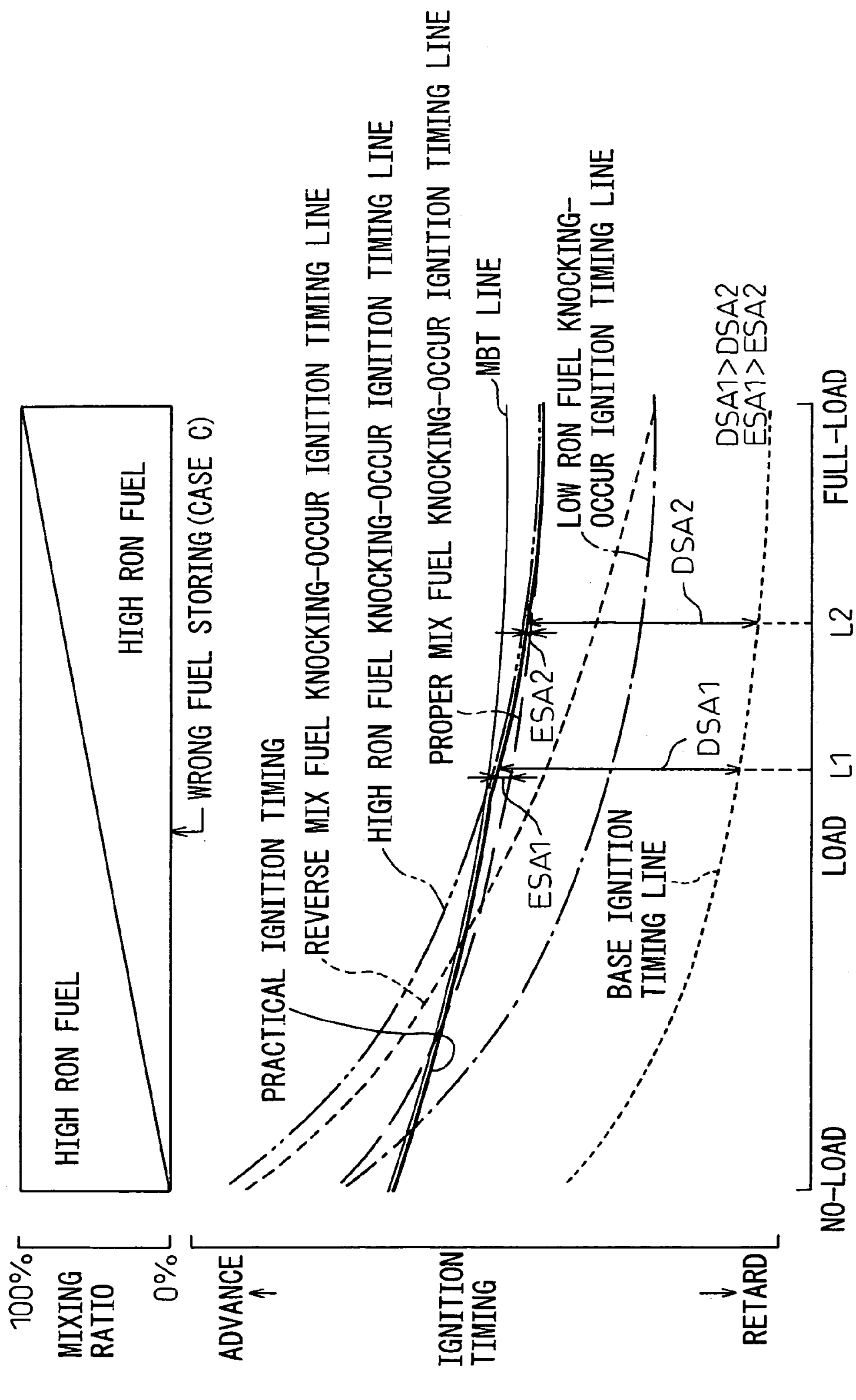
FIG. 5 is a diagram showing an ignition timing when a high RON fuel is stored in both a low RON fuel tank and a high RON fuel tank.

FIG. 5 is an explanatory view of Case C, in which only the high RON fuel is injected in a range from the no-load to the full-load, in a same engine speed, and six ignition timing lines shown in FIG. 2, are shown.

The practical ignition timing SA coincides with the high RON fuel knocking-occur ignition timing line if the high RON fuel knocking-occur ignition timing is more retarded than the MBT, and the practical ignition timing SA coincides with the MBT if the high RON fuel knocking-occur ignition timing is more advanced than the MBT. Therefore, the practical ignition timing SA changes as shown by a thick solid line.

The high RON fuel knocking-occur ignition timing line comes closer to the proper mix fuel knocking-occur ignition timing line as the load is decreased. Therefore, in a comparison of the adjusting ignition advance angles DSA1 and DSA2 at load values L1 and L2 (L1<L2), preselected in a zone where the high RON fuel knocking-occur ignition timing is more retarded than the MBT, DSA1>DSA2.

Figure 6:
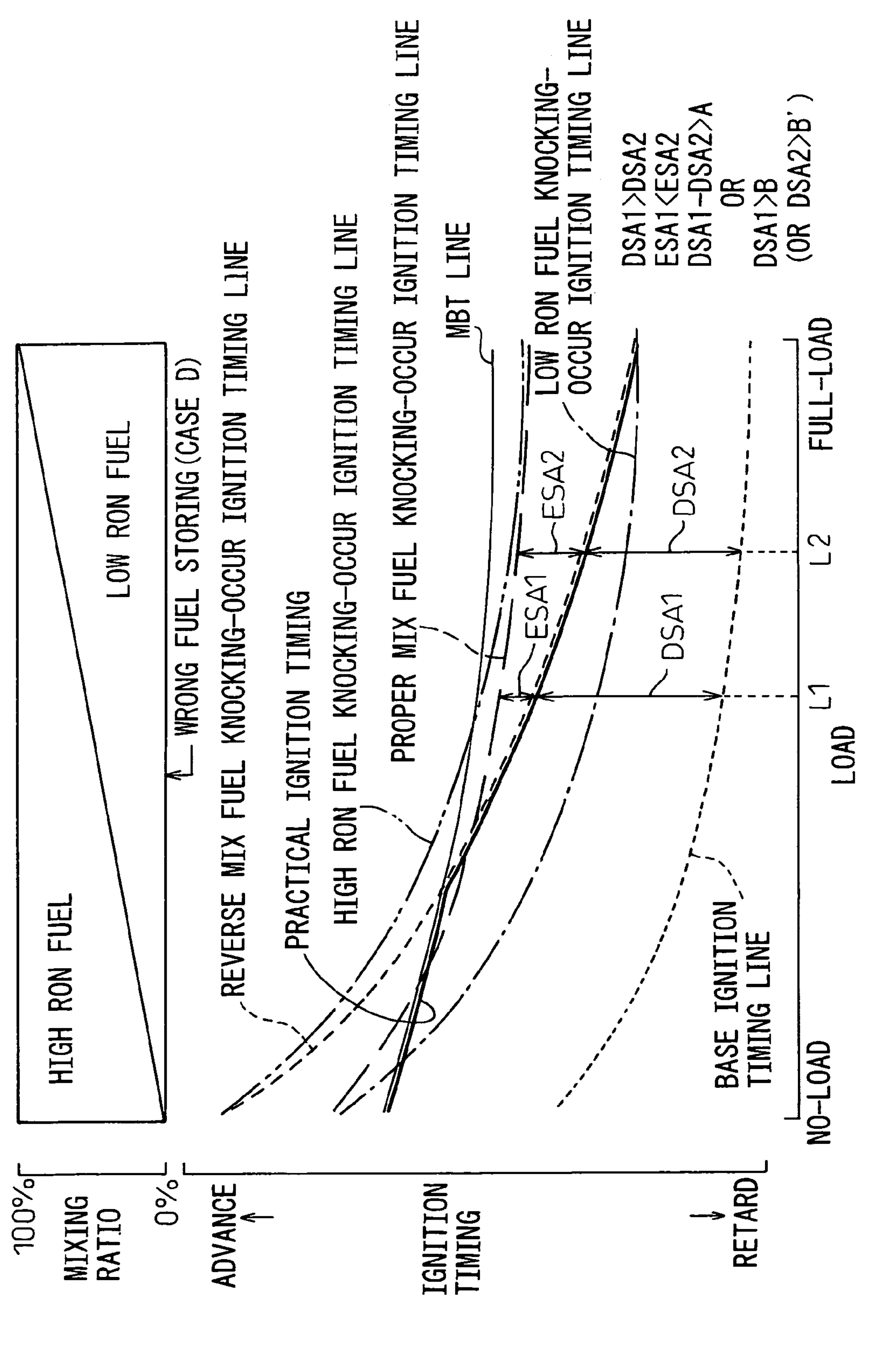
FIG. 6 is a diagram showing an ignition timing when a high RON fuel is stored in a low RON fuel tank and a low RON fuel is stored in a high RON fuel tank.

FIG. 6 is an explanatory view of Case D, in which the low RON fuel and the high RON fuel are mixed so that the ratio of the low RON fuel is increased and the ratio of the high RON fuel is decreased as the load is increased, and are injected, in a same engine speed.

In FIG. 6, six ignition timing lines shown in FIG. 2 are shown.

The practical ignition timing SA coincides with reverse mix fuel knocking-occur ignition timing if the reverse mix fuel knocking-occur ignition timing is more retarded than the MBT, and the practical ignition timing SA coincides with the MBT if the reverse mix fuel knocking-occur ignition timing is more advanced than the MBT. Therefore, the practical ignition timing SA changes as shown by a thick solid line. Therefore, in a comparison of the adjusting ignition advance angles DSA1 and DSA2 at load values L1 and L2 (L1<L2), preselected in a zone where the reverse mix fuel knocking-occur ignition timing is more retarded than the MBT, DSA1>DSA2.

As described above, in case A, DSA1=DSA2, and in Cases B, C and D, DSA1>DSA2. Therefore, the storage can be judged to be case A (correct storing) when DSA1=DSA2, and the storage can be judged to be one of cases B, C, D (wrong storing) when DSA1≠DSA2. However, it is not possible to determine a type of storage failure.

Then, the proper mix fuel knocking-occur ignition timing is introduced as a middle comparing ignition timing. The middle comparing ignition timing and the practical ignition timing SA are compared with each other at the load values L1 and L2, and the differences therebetween at L1 and L2, which are referred to as middle comparing ignition timing differences ESA1 and ESA2, are compared.

In Case B, ESA1<ESA2 because the line of the practical ignition timing SA, i.e., the low RON fuel knocking-occur ignition timing line is more retarded than the proper mix fuel knocking-occur ignition timing line, and comes closer to the proper mix fuel knocking-occur ignition timing line as the load is decreased.

In Case C, ESA1>ESA2, because the line for practical ignition timing SA, i.e., the high RON fuel knocking occur ignition timing line is more advanced than the proper mix fuel knocking-occur ignition timing line, and comes closer to the proper mix fuel knocking-occur ignition timing line as the load is increased.

In Case D, ESA1<ESA2, because the line for practical ignition timing SA, i.e., the reverse mix fuel knocking occur ignition timing line is more retarded than the proper mix fuel knocking-occur ignition timing line, and comes closer to the proper mix fuel knocking-occur ignition timing line as the load is decreased.

Accordingly, it can be said that, the storage is case C if ESA1>ESA2, and the storage is case B or D if ESA1<ESA2.

Or, it can be said that, the storage is case C if the practical ignition timing is more advanced than the proper mix fuel knocking occur ignition timing, and the storage is case B or D if the practical ignition timing is more retarded than the proper mix fuel knocking occur ignition timing.

By both ways, however, it is impossible to determine the storage to be case B or D.

Therefore, the storage is determined to be case B or D as follows.

The value of DSA in case B decreases more steeply as the load increases than in case D, i.e. difference between values of DSA at predetermined two load values in case B is greater than that of case D.

Therefore, calculate difference between values of DSA at predetermined two load values. Then compare the difference with a predetermined threshold A. Thus, storage is determined to be case B if the difference is greater than the threshold A, and storage is determined to be case D if the difference is smaller than the threshold A.

In this regard, if the L1 and L2 are predetermined the difference between values of two DSA can be obtained by calculation of DSA1–DSA2. This requires no further change of load only for this calculation, and then less calculation load is obtained. Therefore, L1 and L2 are predetermined in this embodiment.

The storage is determined to be case B or D also by as follows:

A value of DSA in case D is greater than a value of DSA in case D, if both values of DSA are obtained at same load. Therefore, calculate DSA and compare it with a predetermined threshold B. The storage is determined to be case D if value of DSA is greater than a predetermined threshold B, and the storage is determined to be case B if value of DSA is less than a predetermined threshold B.

In this case, if the L1 and L2 are predetermined, the DSA1 can be compared with threshold B (or DSA2 can be compared with threshold B').

Figure 7:
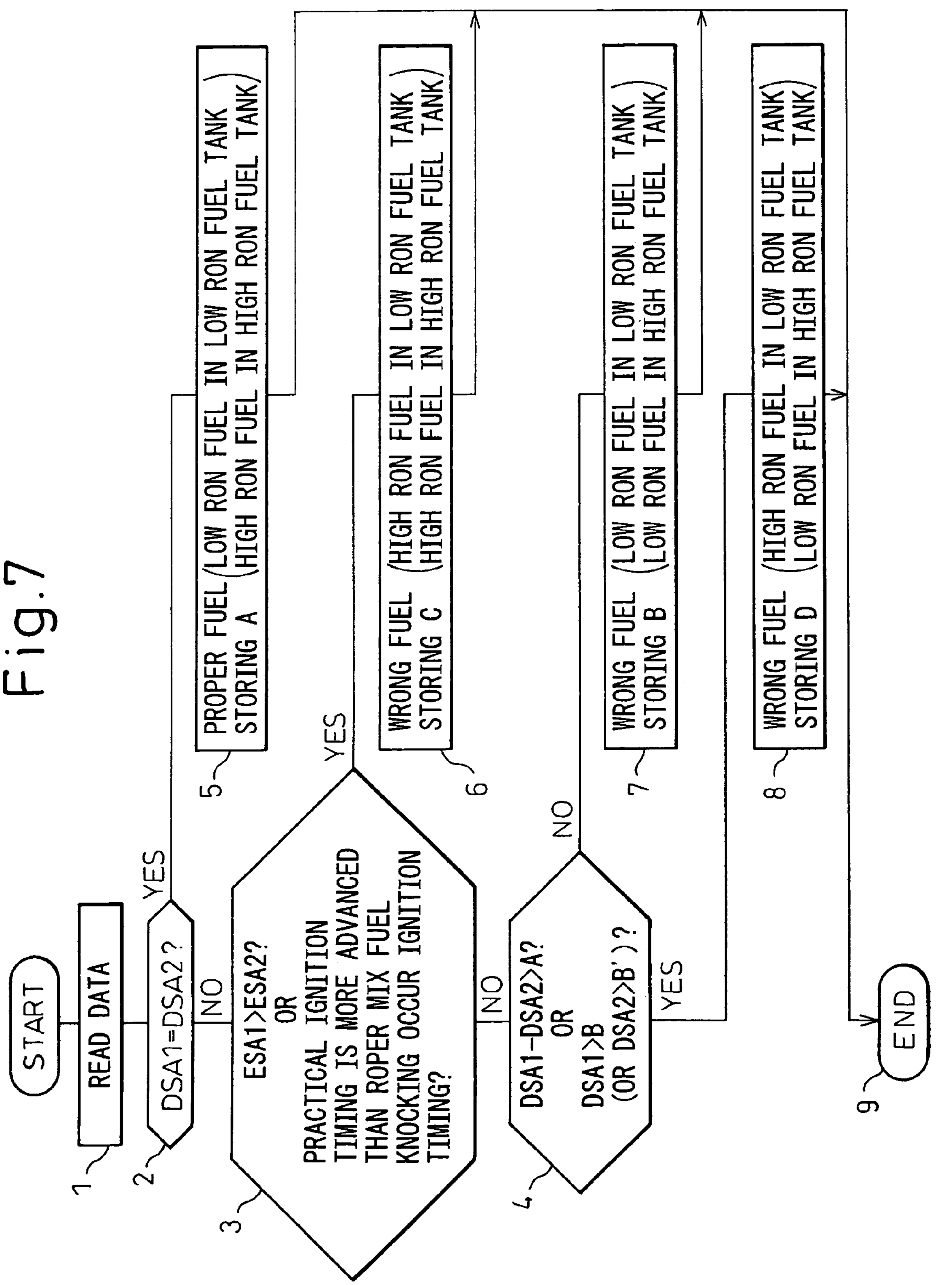
FIG. 7 is a flowchart of a judgment of a storage in the embodiment.

The control of a judgment for storage according to the present invention, based on the above concept, will be described with reference to a flowchart shown in FIG. 7.

In step 1, data such as the adjusting ignition advance angles DSA1, DSA2 at predetermined load values L1, L2, is read. In step 2, whether or not DSA1 is equal to DSA2 is judged. If the judgment is affirmative in step 2, the process goes to step 5 in which it is judged that the storage is Case A, i.e., a proper storage in which the low RON fuel is stored in the low RON fuel tank and the high RON fuel is stored in the high RON fuel tank, and the process goes to step 9 and ends.

If the judgment is negative in step 2, the process goes to step 3. In step 3, whether or not ESA1<ESA2, or whether or not the practical ignition timing is more advanced than the proper mix fuel knocking occur ignition timing, is judged. If the judgment is affirmative in step 3, the process goes to step 6. In step 6, it is judged that the storage is Case C, i.e., a storage failure in which the high RON fuel is stored both in the low RON fuel tank and the high RON fuel tank, and the process goes to step 9 and ends.

If the judgment is negative in step 3, the process goes to step 4. In step 4, whether or not DSA1>B (or DSA2>B') is judged. If the judgment is negative in step 4, the process goes to step 7. In step 7, it is judged that the storage is Case B, i.e., a storage failure in which the low RON fuel is stored both in the high RON fuel tank and the low RON fuel tank, and the process goes to step 9 and ends.

If the judgment is affirmative in step 4, the process goes to step 8. In step 8, it is judged that the storage is Case D, i.e., a storage failure in which the high RON fuel is stored in the low RON fuel tank and the low RON fuel is stored in the high RON fuel tank, and the process goes to step 9 and ends.

Judgment results obtained at the steps 5, 6, 7, and 8 are displayed on a judgment result display designated by reference numeral 21 in FIG. 1, so as to be recognized by a driver.

Figure 8:
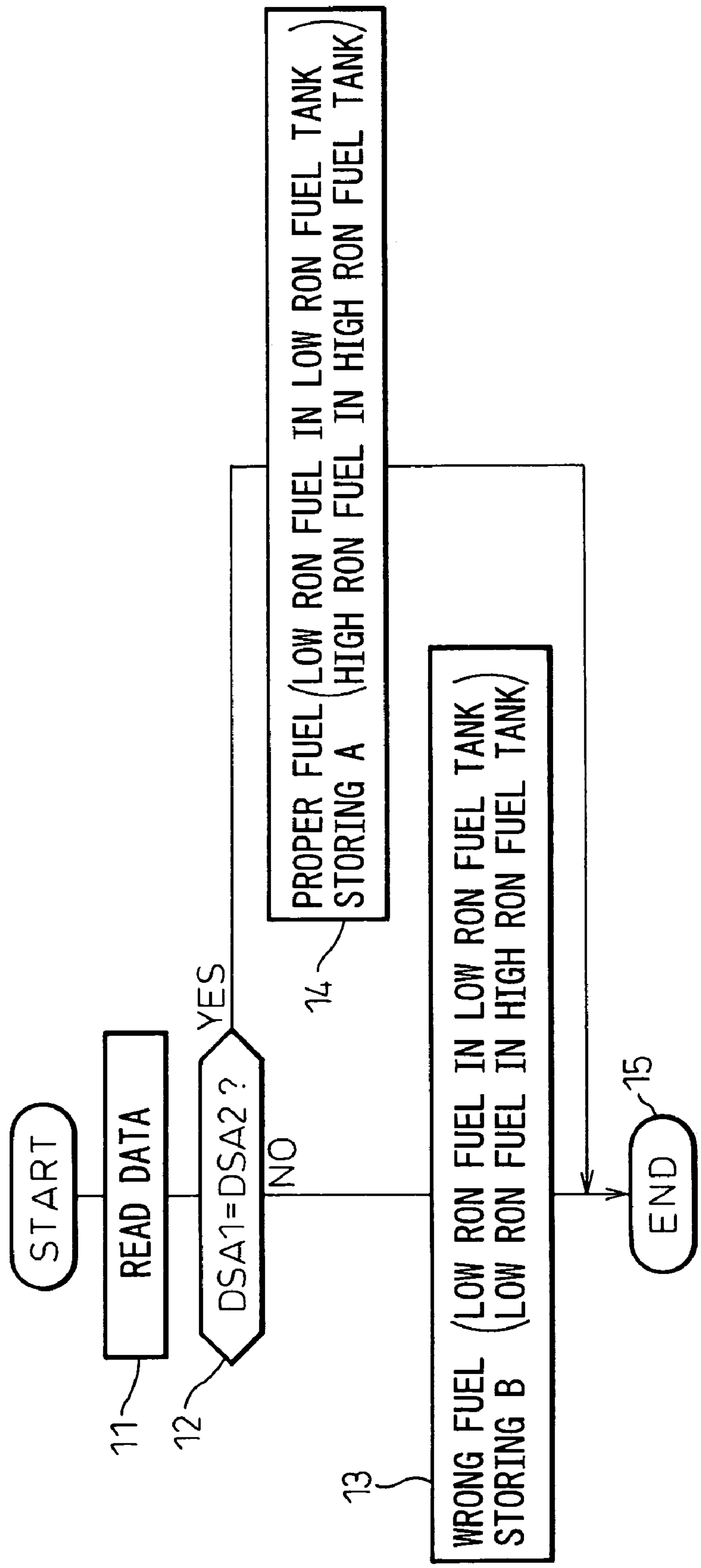
FIG. 8 is a flowchart of a judgment of a storage in a modification of the embodiment.

FIG. 8 shows a modification of the above embodiment. In a manner similar to the above embodiment, after data is read in step 11, the process goes to step 12 and, then, whether or not DSA 1 is equal to DSA2 is judged. If the judgment is affirmative in step 12, the process goes to step 14 in which it is judged that the storage is proper, i.e., the low RON fuel is stored in the low RON fuel tank and the high RON fuel is stored in the high RON fuel tank, and the process goes to step 15 and ends.

On the other hand, if the judgment is negative in step 12, the process goes to step 13 in which it is judged that the case is Case B, i.e., a proper storage in which the low RON fuel is stored in the low RON fuel tank and is also stored in the high RON fuel tank, and the process goes to step 5 and ends.

As described above, if DSA1 is not equal to DSA2, there is a possibility that the storage may be Case C or D in addition to Case B. However, it is immediately judged that the case is Case B, i.e., the case in which the low RON fuel is stored in the low RON fuel tank and is also stored in the high RON fuel tank, on the following grounds.

In general, the high RON fuel is more expensive than the low RON fuel. Some gas stations have fueling equipment for low RON fuel, however, they have no fueling equipment for high RON fuel. Accordingly, there is a highest possibility that the storage failure is Case B, i.e., the low RON fuel is stored in the low RON fuel tank and is also stored in the high RON fuel tank. Therefore, it is immediately judged that Case B is the case. This modification corresponds to claim 4 of the present application.

As described above, the embodiment of the present invention and the modification thereof have been described. However, the present invention is not limited to this, and can be applied to a case in which a vehicle is provided with a fuel separator to separate an original fuel into the low RON fuel and the high RON fuel that are stored in the low RON fuel tank and the high RON fuel tank, respectively. In this case, whether or not the fuel separator works properly may be judged.

What is claimed is:

1. A spark ignition engine provided with a low RON fuel tank to store a low RON fuel and a high RON fuel tank to store a high RON fuel, in which the fuel in the low RON fuel tank and the fuel in the high RON fuel tank are injected into a combustion chamber, at a mixing ratio in accordance with the state of operation of the engine, comprising fuel mixing means for mixing the fuel from the high RON fuel tank and the fuel from the low RON fuel tank at a predetermined mixing ratio, so that the ratio of the fuel from the high RON fuel tank is increased as the load is increased and the ratio of the fuel from the low RON fuel tank is increased as the load is decreased;

practical ignition timing determination means for determining a practical ignition timing based on the state of occurrence of knocking during a practical operation of the engine; and comparing ignition timing memory means for storing a comparing ignition timing with which the practical ignition timing is compared, wherein whether or not the low RON fuel and the high RON fuel are properly stored in the low RON fuel tank and the high RON fuel tank, respectively, is judged based on differences between the comparing ignition timing and the practical ignition timing, at predetermined plural load values.

2. A spark ignition engine according to claim 1, wherein the comparing ignition timing memory means stores a base ignition timing which is set in parallel with a proper mix fuel knocking-occur ignition timing representing a knocking-occur ignition timing when the low RON fuel is reserved in the low RON fuel tank and the high RON fuel is reserved in the high RON fuel tank, respectively, in relation to the load, and the practical ignition timing determination means determines that an ignition timing obtained by advancing an adjusting ignition advance angle from the base ignition timing to an actual knocking limit is identical to the practical ignition timing.

3. A spark ignition engine according to claim 2, wherein it is judged that the low RON fuel and the high RON fuel are properly stored to the low RON fuel tank and the high RON fuel tank when differences between the base ignition timing and the practical ignition timing at different loads are identical, and it is judged that the low RON fuel and the high RON fuel are improperly stored to the low RON fuel tank and the high RON fuel tank when differences between the base ignition timing and the practical ignition timing at different loads are not identical.

4. A spark ignition engine according to claim 3, wherein it is judged that the low RON fuel is stored both in the low RON fuel tank and the high RON fuel tank when differences between the base ignition timing and the practical ignition timing at different loads are not identical.

5. A spark ignition engine according to claim 3, wherein the comparing ignition timing memory means stores the proper mix fuel knocking-occur ignition timing as a comparing ignition timing; and when differences between the base ignition timing and the practical ignition timing at different loads are not identical and judged that the low RON fuel and the high RON fuel are improperly stored to the low RON fuel tank and the high RON fuel tank, it is judged that the high RON fuel is stored both in the low RON fuel tank and the high RON fuel tank when a difference between the proper mix fuel knocking-occur ignition timing and the practical ignition timing is decreased as the load is increased, and it is judged that the low RON fuel is stored both in the low RON fuel tank and the high RON fuel tank or the low RON fuel is stored in the high RON fuel tank and the high RON fuel is stored in the low RON fuel tank when a difference between the proper mix fuel knocking-occur ignition timing and the practical ignition timing is increased as the load is increased.

6. A spark ignition engine according to claim 3, wherein the comparing ignition timing memory means stores the proper mix fuel knocking-occur ignition timing as a comparing ignition timing; and when differences between the base ignition timing and the practical ignition timing at different loads are not identical and judged that the low RON fuel and the high RON fuel are improperly stored to the low RON fuel tank and the high RON fuel tank, it is judged that the high RON fuel is stored both in the low RON fuel tank and the high RON fuel tank when the practical ignition timing is more advanced than the proper mix fuel knocking-occur ignition timing, and it is judged that the low RON fuel is stored both in the low RON fuel tank and the high RON fuel tank or the low RON fuel is stored in the high RON fuel tank and the high RON fuel is stored in the low RON fuel tank when the practical ignition timing is more retarded than the proper mix fuel knocking-occur.

7. A spark ignition engine according to claim 5, wherein when it is judged that the low RON fuel is stored both in the low RON fuel tank and the high RON fuel tank or the low RON fuel is stored in the high RON fuel tank and the high RON fuel is stored in the low RON fuel tank, it is judged that the low RON fuel is stored in the high RON fuel tank and the high RON fuel is stored in the low RON fuel tank when a difference of differences between the proper mix fuel knocking-occur ignition timing and practical ignition timing at predetermined two load is greater than a predetermined threshold, and it is judged that the low RON fuel is stored both in the high RON fuel tank and the low RON fuel tank when a difference of differences between the proper mix fuel knocking-occur ignition timing and practical ignition timing at predetermined two load is less than a predetermined threshold.

8. A spark ignition engine according to claim 5, wherein when it is judged that the low RON fuel is stored both in the low RON fuel tank and the high RON tank or the low RON fuel is stored in the high RON fuel tank and the high RON fuel is stored in the low RON fuel tank, it is judged that the low RON fuel is stored in the high RON fuel tank and the high RON fuel is stored in the low RON fuel tank when a difference between the proper mix fuel knocking-occur ignition timing and practical ignition timing at a predetermined load is greater than a predetermined threshold, and it is judged that the low RON fuel is stored both in the high RON fuel tank and the low RON fuel tank when a difference between the proper mix fuel knocking-occur ignition timing and practical ignition timing at a predetermined load is less than a predetermined threshold.

9. A spark ignition engine according to claim 1, further comprising judgment result display means to display judgment results.

10. A spark ignition engine according to claim 6, wherein when it is judged that the low RON fuel is stored both in the low RON fuel tank and the high RON fuel tank or the low RON fuel is stored in the high RON fuel tank and the high RON fuel is stored in the low RON fuel tank, it is judged that the low RON fuel is stored in the high RON fuel tank and the high RON fuel is stored in the low RON fuel tank when a difference of differences between the proper mix fuel knocking-occur ignition timing and practical ignition timing at predetermined two load is greater than a predetermined threshold, and it is judged that the low RON fuel is stored both in the high RON fuel tank and the low RON fuel tank when a difference of differences between the proper mix fuel knocking-occur ignition timing and practical ignition timing at predetermined two load is less than a predetermined threshold.

11. A spark ignition engine according to claim 5, wherein when it is judged that the low RON fuel is stored both in the low RON fuel tank and the high RON tank or the low RON fuel is stored in the high RON fuel tank and the high RON fuel is stored in the low RON fuel tank, it is judged that the low RON fuel is stored in the high RON fuel tank and the high RON fuel is stored in the low RON fuel tank when a difference between the proper mix fuel knocking-occur ignition timing and practical ignition timing at a predetermined load is greater than a predetermined threshold, and it is judged that the low RON fuel is stored both in the high RON fuel tank and the low RON fuel tank when a difference between the proper mix fuel knocking-occur ignition timing and practical ignition timing at a predetermined load is less than a predetermined threshold.

* * * * *